2,987,532
METHOD OF MAKING DIVINYLMERCURY

Donald J. Foster, South Charleston, and Erich Tobler, Charleston, W. Va., assignors to Union Carbide Corporation, a corporation of New York
No Drawing. Filed May 18, 1959, Ser. No. 813,633
7 Claims. (Cl. 260—431)

This invention relates to a new chemical compound, divinylmercury, and a method of making it.

While numerous compounds containing mercury to carbon bonds have been reported in the chemical literature, no vinyl compound of mercury has been among them. We have now discovered divinylmercury, which may be represented by the formula $(CH_2=CH)_2Hg$. We have found that this compound can be made by reacting a compound containing mercury and a halogen with a vinyl organometallic compound such as vinylsodium, vinyllithium, vinylpotassium, or the like. The latter compounds can be made by any convenient method such as that described for vinylsodium by Morton in The Journal of the American Chemical Society, volume 72, page 3875 (1950). The vinyl organometallic compound used in the process can also be a vinyl organometallic halide such as a vinylmagnesium halide, or the like.

According to one embodiment of our process, two molar equivalents of a vinyl organometallic, including vinyl organometallic halides, are reacted with one mole equivalent of mercury dihalide, as represented by the equations:

(I)  $2CH_2=CHM + HgX_2 \rightarrow (CH_2=CH)_2Hg + 2MX$
(II) $2CH_2=CHMX + HgX_2 \rightarrow (CH_2=CH)_2Hg + 2MX_2$ wherein M is a metal more electropositive than mercury and X is a halogen. In another embodiment of our process, one equivalent of a vinyl organometallic compound, including vinyl organometallic halides, is reacted with one equivalent of a vinylmercuric halide, as represented by the equations:

(III) $CH_2=CHM + CH_2=CH-HgX$
$\rightarrow (CH_2=CH)_2Hg + MX$
(IV) $CH_2=CHMX + CH_2=CH-HgX$
$\rightarrow (CH_2=CH)_2Hg + MX_2$ wherein M is a metal more electropositive than mercury and X is a halogen. Preferably, in either embodiment, the two reactants are mixed together in an ether solvent and allowed to react. The reaction product is then hydrolyzed and the organic material is separated from the aqueous phase by conventional means. The solvents are then removed from the organic material by distillation after which the crude divinylmercury remaining is refined by distillation, usually at reduced pressure.

The mercury-halogen compound employed in the process can contain chlorine, bromine or iodine. Suitable compounds thus include mercuric chloride, mercuric bromide and mercuric iodide. The vinyl organometallic compound must contain a metal which is more electropositive than mercury. Vinyl organometallics useful in our invention include vinylsodium, vinyllithium, vinylpotassium, divinylcalcium, divinylmagnesium, divinylzinc, vinylcalcium halide, vinylmagnesium halides and vinylzinc halides, werein the halide can be a chloride, bromide or iodide.

The processes for making divinylmercury are preferably carried out in a solvent or a reaction medium. This solvent can be any organic solvent in which the vinyl organometallic is stable under the reaction conditions. Solvents which may be suitable include benzene, heptane, lower aliphatic ethers, tetrahydrofuran, tetrahydrothiophene, dioxane, ethylene glycol diphenyl ether, diethylene glycol diphenyl ether and the like. Preferred solvents are aliphatic ethers containing from two to twelve carbon atoms such as methyl ether, methyl ethyl ether, ethyl ether, n-propyl ether, isopropyl ether, n-butyl ether, isobutyl ether, amyl ethers, hexyl ethers and mixed ethers of the foregoing. Also preferred are ethers of ethylene glycol and of diethylene glycol. These include ethylene glycol dimethyl ether, ethylene glycol diethyl ether, ethylene glycol methyl ethyl ether, ethylene glycol ethyl butyl ether, ethylene glycol dibutyl ether, diethylene glycol dimethyl ether, diethylene glycol diethyl ether, diethylene glycol ethyl butyl ether, diethylene glycol dibutyl ether, diethylene glycol ethyl hexyl ether, and the like.

The mode or sequence of adding and mixing the reactants is not critical, nor is the reaction temperature narrowly critical. The temperature must be one at which the vinyl organometallic employed in the reaction is stable. Thus, if vinylsodium or a similar vinyl organometallic which will attack the solvent at elevated temperatures is used, the temperature of the reaction must be kept below about 0° C. With a vinyl organometallic such as vinylmagnesium chloride the temperature may be as high as 60° C. Divinylmercury itself is stable at its boiling point in the absence of air.

The mol ratio of reactants should be about two mols of vinyl organometallic to one mol of the mercury dihalide or vinylmercuric halide as the case may be. If less than two molar equivalents of the vinyl organometallic compound are used, the final product will be contaminated with $CH_2=CH-HgX$. If more than two molar equivalents of the vinylorganometallic compound are used, they are hydrolyzed at the end of the reaction to give ethylene, according to the equation:

$$CH_2=CHM + H_2O \rightarrow CH_2=CH_2 + MOH$$

Divinylmercury is useful as an intermediate for making pharmaceutical compounds and a fungicide. It was found to be a very effective fungicide against the test organisms *Fusarium gladiola*, *Aspergillis oryzae* and *Penicillium piscarium*. These organisms were cultured individually on potato dextrose agar (pH 4.5 to 5.5) at a temperature of 20° C. Addition of 1.5 parts per million of divinylmercury prevented any growth of any of the three test fungi during a five-day incubation period. Thus, divinylmercury can be used as an anti-fungus additive for oil paints by adding it in the amount of about 1.5 to 6 parts per million. It is also useful in preventing fungus attack on paper pulp prior to processing it into paper.

Example I

A tetrahydrofuran solution containing 271 grams (1.0 mol) of mercuric chloride was added dropwise to 800 milliliters of a 2.8 normal solution of vinylmagnesium chloride in tetrahydrofuran maintained at a temperature of 20° C. After the addition was complete, the product was allowed to stir for an additional two hours before water was added to hydrolyze the unreacted Grignard reagent and effect a separation of the magnesium salts from the organic layer. The organic layer was separated, dried over magnesium sulfate and distilled first at atmospheric pressure to remove the solvent and later at a reduced pressure of 5 millimeters of mercury to obtain pure divinylmercury. Divinylmercury was found to be a clear, colorless liquid boiling at a temperature of 157° C. at atmospheric pressure or at a temperature of 43° C. to 45° C. at 5 millimeters of mercury pressure. The density, $d_4^{25}$, was 2.760 and the refractive index, $n_D^{20}$, was 1.5990. The yield of pure doubly distilled product was 184 grams (72 percent of the theoretical). A comparison of the theoretical carbon, hydrogen, mercury analysis with the analysis actually found showed the following:

Calculated for $C_4H_6Hg$: C, 18.86; H, 2.38; Hg, 78.76.
 Found: C, 18.9; H, 2.4; Hg, 78.8.

The molecular weight which was calculated as 255 was found to be 258.

*Example II*

A butyl ether slurry containing 135 grams (0.5 mol) of mercuric chloride was added portion-wise to a butyl ether suspension containing 50 grams (1.0 mol) of vinylsodium maintained at a temperature of about minus 10° C. After the addition was complete, the reaction mixture was stirred for an additional thirty minutes before it was allowed to come to room temperature. Water was added to hydrolyze unreacted starting material and dissolved the inorganic salts. The organic layer was dried over magnesium sulfate and distilled at a reduced pressure of 20 millimeters of mercury. After removal of the solvent, the product boiled at a temperature of 59° C. to 61° C. at 20 millimeters. This product was divinylmercury having the same properties as those obtained in Example I.

*Example III*

To 0.1 mol of vinylmagnesium bromide, prepared from vinyl bromide and magnesium in tetrahydrofuran, was added dropwise with stirring 26.3 grams (0.1 mol) of vinylmercuric chloride dissolved in tetrahydrofuran. The reaction temperature was maintained at 20° C. to 25° C. during the addition and then raised to 50° C. for an additional half hour of stirring. The crude reaction mixture was cooled to a temperature between 0° C. and 10° C. and there was then added 250 milliliters of ethyl ether saturated with water followed by 250 milliliters of water. The organic layer was separated, washed with water, dried over sodium sulfate and distilled at atmospheric pressure to remove the solvents. The residue was distilled at a reduced pressure of 6 millimeters of mercury to give approximately a 50 percent yield of divinylmercury boiling at a temperature of 46° C. to 48° C. at 6 millimeters of mercury pressure.

We claim:

1. Process for making divinylmercury which comprises reacting a vinyl organometallic compound of the formula $CH_2=CHM$, wherein the metal M is more electropositive than mercury, with a compound selected from the group consisting of mercury dihalides and vinyl mercuric halides.

2. Process for making divinylmercury which comprises reacting a vinyl organometallic compound of the formula $CH_2=CHM$, wherein the metal M is more electropositive than mercury, with a mercury dihalide.

3. Process for making divinylmercury which comprises reacting a vinyl organometallic compound of the formula $CH_2=CHM$, wherein the metal M is more electropositive than mercury, with a mercury dihalide; the reaction medium being a solvent in which said organometallic is stable.

4. Process for making divinylmercury which comprises reacting a vinyl organometallic compound of the formula $CH_2=CHM$, wherein the metal M is more electropositive than mercury, with a mercury dihalide; the reaction medium being an aliphatic ether containing from two to twelve carbon atoms.

5. Process for making divinylmercury which comprises reacting a vinyl organometallic compound of the formula $CH_2=CHM$ wherein the metal M is more electropositive than mercury, with a vinyl mercuric halide.

6. Process for making divinylmercury which comprises reacting a vinyl organometallic compound of the formula $CH_2=CHM$, wherein the metal M is more electropositive than mercury, with a vinyl mercuric halide; the reaction medium being a solvent in which said organometallic is stable.

7. Process for making divinylmercury which comprises reacting a vinyl organometallic compound of the formula $CH_2=CHM$, wherein the metal M is more electropositive than mercury, with a vinyl mercuric halide; the reaction medium being an aliphatic ether containing from two to twelve carbon atoms.

References Cited in the file of this patent

Chemical Reviews, vol. 54, No. 1, February 1954, page 108.

Proceedings of The Chemical Society, April 1958, page 116.